United States Patent [19]

Henderson

[11] Patent Number: 5,775,920
[45] Date of Patent: Jul. 7, 1998

[54] ROLLING ELASTOMER CONTACT CLOCKSPRING

[75] Inventor: Brent Eugene Henderson, Golden, Ill.

[73] Assignee: Methode Electronics, Inc., Chicago, Ill.

[21] Appl. No.: 522,628

[22] Filed: Sep. 1, 1995

[51] Int. Cl.⁶ .............................................. H01R 39/00
[52] U.S. Cl. .............................................. 439/15
[58] Field of Search .................... 439/15, 17, 19, 439/18, 24, 29, 21

[56] References Cited

U.S. PATENT DOCUMENTS

| | | | |
|---|---|---|---|
| 1,238,448 | 8/1917 | Shaw | 439/21 |
| 4,372,633 | 2/1983 | Allen et al. | 339/5 M |
| 4,650,266 | 3/1987 | Jacobson et al. | 339/5 R |
| 4,722,690 | 2/1988 | Priede | 439/15 |
| 5,009,604 | 4/1991 | Plocek et al. | 439/15 |
| 5,061,195 | 10/1991 | Bolen | 439/164 |
| 5,429,508 | 7/1995 | Brevick | 439/15 |

Primary Examiner—Khiem Nguyen
Assistant Examiner—Eugene G. Byrd
Attorney, Agent, or Firm—David L. Newman

[57] ABSTRACT

An interconnector electrically unites a rotatable air bag assembly with a stationary air bag sensor. The interconnector has a rotor rotatably associated with a stator to define a radial space including one or more complementary first and second electrically conductive tracks. The tracks are united with one or more rolling elastomer contacts to complete the electrical pathway from the sensor to the air bag.

8 Claims, 3 Drawing Sheets

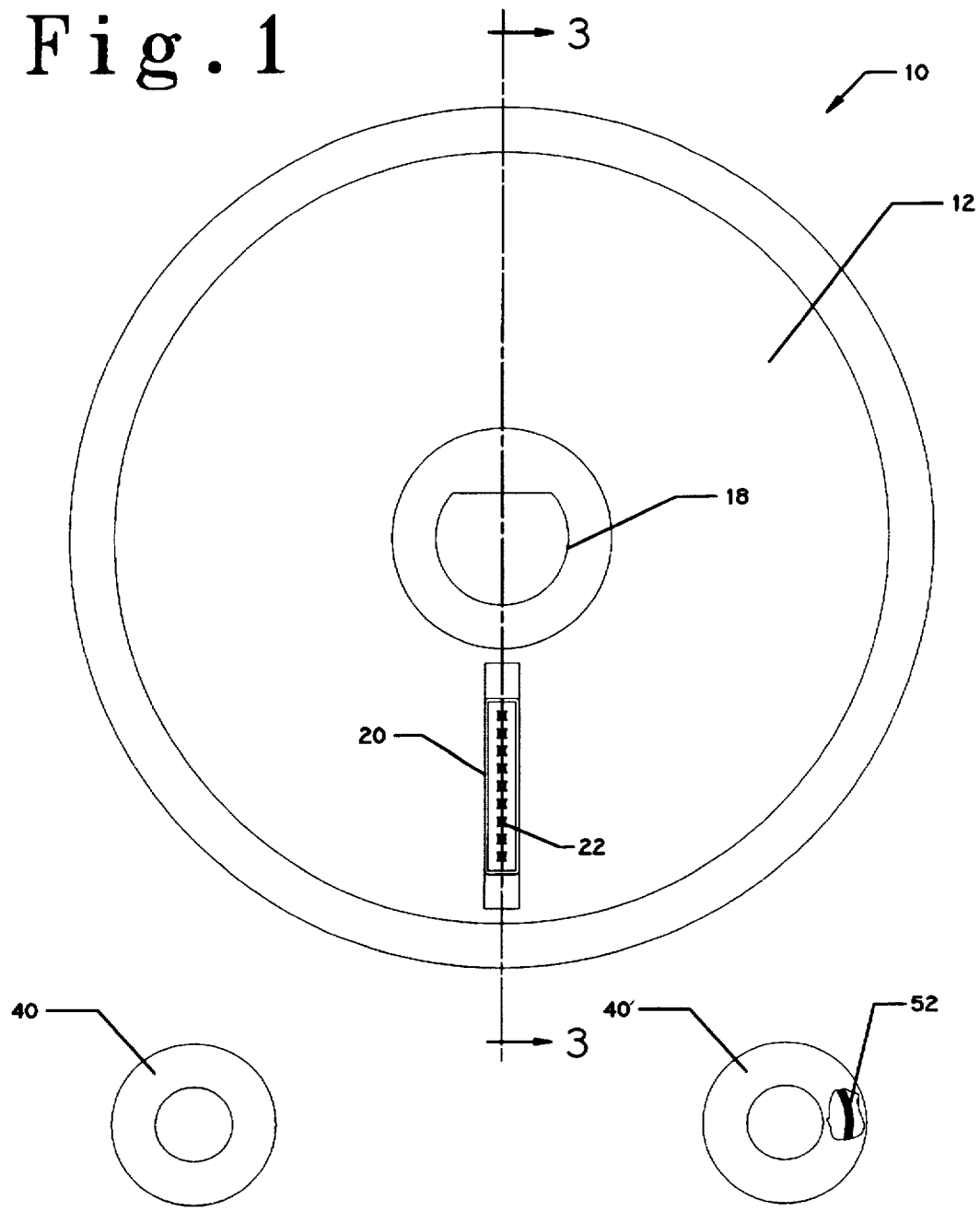

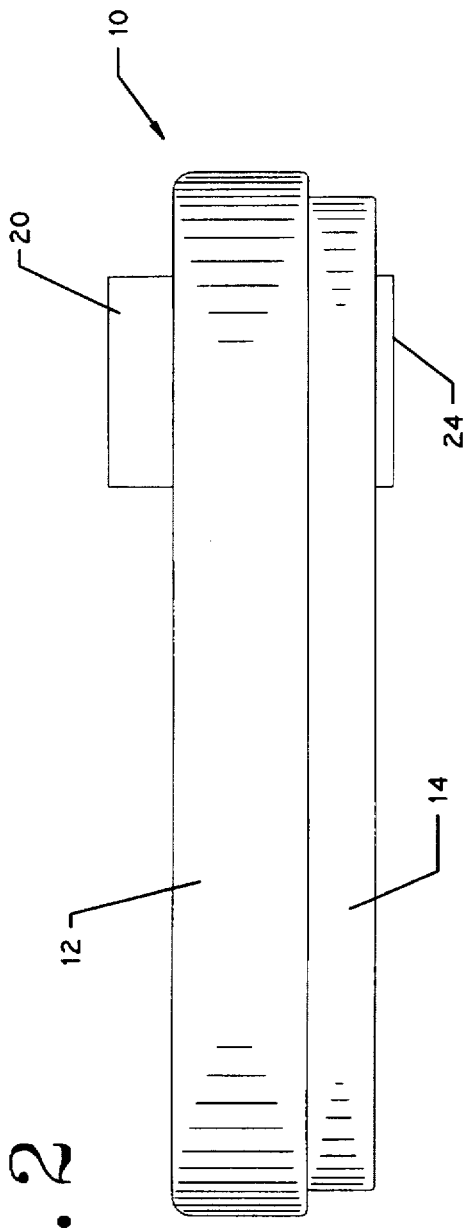
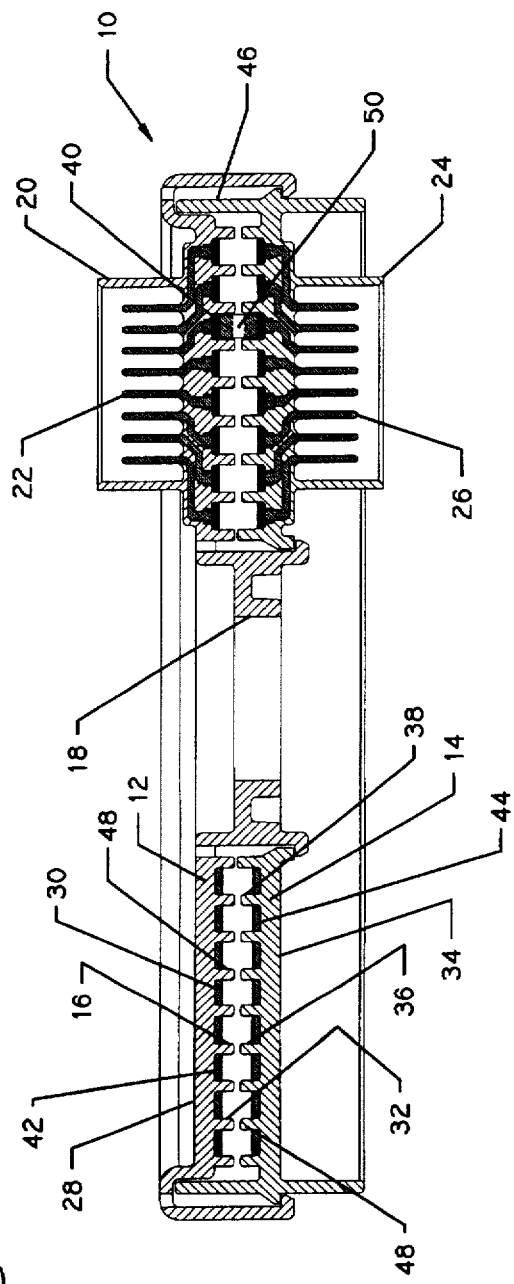

ROLLING ELASTOMER CONTACT CLOCKSPRING

BACKGROUND OF THE INVENTION

1. Field of the Invention

The present invention relates generally to an automobile steering column interconnector. More, specifically, the present invention relates to an automobile steering column interconnector that electrically unites a rotatable air bag assembly with a stationary sensor using one or more conductors that are simultaneously associated with the interconnector rotor and stator. The conductors are preferably elastomer conductive rolling contacts that electrically unite a stationary interconnector stator with a rotatable interconnector rotor.

An increasing number of automobiles have air bag crash systems. An air bag crash system typically includes an air bag located on the steering wheel facing the driver. The air bag must be in continuous electrical connection with one or more sensors in the car body. The sensors provide an electrical signal to the air bag crash assembly which instantly inflates the air bag in the event of a crash.

Accordingly, there is a need for an electrical connection between the rotatable portion of the air bag assembly which is mounted in the steering wheel and the sensors which are in a stationary position in the car body. Electrical connections between rotatable and stationary parts of a steering wheel are well known. Typically, a coiled electrical conductor, known as a clockspring, is united at one end to a stationary stator and at the other end to a rotatable rotor. Rotation of the rotor causes the coiled electrical conductor to tighten and to loosen much like the spring within a clock while maintaining the electrical connection.

There is a risk that the coiled electrical conductor will fail due to over rotation of the steering wheel or through overuse. As a result, elaborate methods are used to prevent clockspring interconnectors from being over rotated and to ensure their proper initial orientation during installation. These measures are costly and add additional parts to the clockspring devices which can fail.

2. Description of the Art

Automobile steering column interconnectors referred to as "clocksprings" are well known in the art. Examples of automobile clocksprings are shown in U.S. Pat. Nos. 5,061,195 and 4,722,690. Automobile clockspring interconnectors electrically unite a stationary sensor in a car body with an automobile air bag located in a steering wheel via a spirally wound coil of electrically conductive tape. An electrical signal from the sensor passes to the clockspring through the electrically conductive tape to actuate the air bag in the steering column. Air bag interconnectors that do not use coiled conductive tape or wire windings to create an electrical pathway are also know in the art. For example, U.S. Pat. No. 5,009,604 describes an interconnector assembly that uses sliding resilient contact members to complete the electrical path between the interconnector stator and rotor. The use of sliding contacts, however, is very noisy and unreliable due to the constant friction which is generated by the sliding movement of the contact members.

Furthermore, U.S. Pat. Nos. 4,650,266 and 4,372,633 disclose an apparatus useful in satellites for transferring high electrical currents. The apparatus disclosed in each of the patents includes a plurality of horizontal rolling rings that act in unison to transfer an electrical current from a rotatable element to a stationary element.

Finally, U.S. Pat. No. 5,429,508 discloses an interconnector which uses metallic rings to transfer electrical current from a rotatable element to a stationary element. However, the use of metallic rings can be very noisy. Moreover, metallic rings can oxidize which will prevent electrical current form transferring from the rotatable element to the stationary element. Furthermore, metallic rings may fracture due to the stress cause by continuous flexing and compression.

Correspondingly, in view of the above, it is an object of the present invention to provide an automobile clockspring interconnector that unites a rotatable air bag with a stationary sensor without the use of a coiled conductive tape.

It is another object of the present invention to provide a quiet automobile clockspring interconnector that uses rolling elastomer contacts to unite a rotatable air bag assembly with a stationary sensor.

It is yet another object of the present invention to provide an automobile clockspring interconnector that contains rolling elastomer contacts which electrically unite a stationary sensor to a rotatable air bag assembly.

Furthermore, other objects, features, and advantages of the present invention will be apparent from the following detailed description taken in connection with the accompanying drawing.

SUMMARY OF THE INVENTION

In one form of the invention, the present invention provides a steering column interconnector. The steering column interconnector comprises a stator and a rotor rotatably associated with the stator to create a radial space along with an aperture passing through the rotor and the stator. A first connector is associated with the stator while a second connector is associated with the rotor. The stator includes at least one stator annular recess associated with an inner face of the stator. The stator annular recess contains an electrically conductive track associated with the first connector. The rotor includes at least one rotor annular recess located on the inner face of the rotor. The rotor annular recess is complementary to a stator annular recess. The rotor inner recess includes an electrically conductive track associated with the second connector. At least one elastomer rolling contact unites the first electrically conductive track and the second electrically conductive track.

In another embodiment, the present invention provides a steering column interconnector comprising a stator and a rotor rotatably associated with the stator to create a radial space. The interconnector includes an aperture passing through the rotor and the stator, a first connector associated with the rotor, and a second connector associated with the stator. A plurality of rotor annular recesses are associated with an inner face of the rotor. Each rotor annular recess includes a first electrically conductive track. A plurality of stator annular recesses are associate with an inner face of the stator, and each stator annular recess includes a second electrically conductive track. One or more elastomer rolling contacts electrically unite complementary first electrically conductive tracks with second electrically conductive tracks.

Additional features and advantages of the present invention are described in, and will be apparent from, the detailed description of the presently preferred embodiments and from the drawings.

BRIEF DESCRIPTION OF THE DRAWINGS

There is shown in the drawings a presently preferred embodiment of the present invention, wherein like numerals in the various figures pertain to like elements, and wherein:

3

Figure 4:
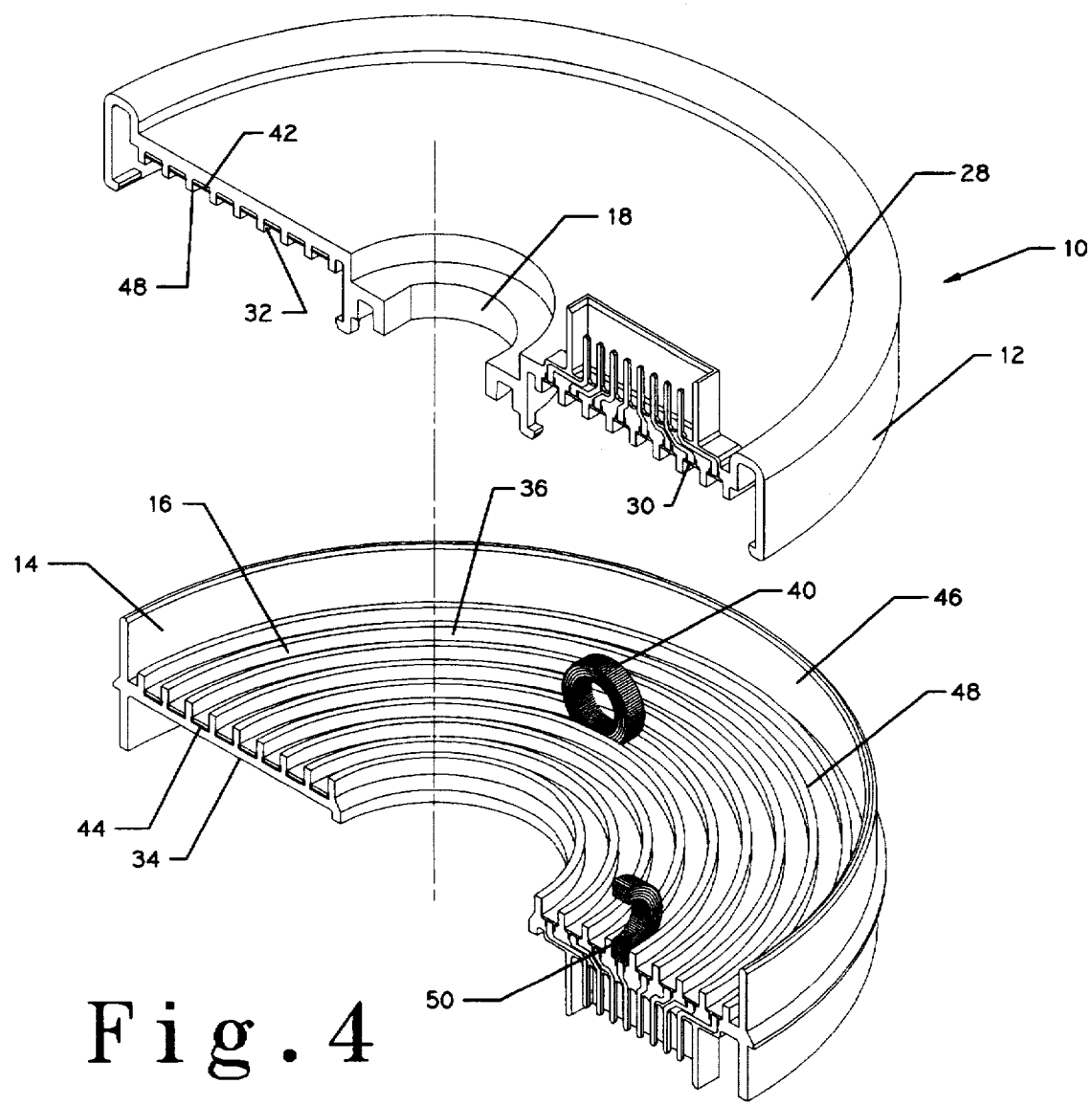

FIG. 1 illustrates a top view of a steering column interconnector of the present invention;

FIG. 2 illustrates a side view of the steering column interconnector of FIG. 1;

FIG. 3 illustrates a cross-sectional side view of the steering column interconnector depicted in FIG. 1, taken along line 3—3;

FIG. 4 illustrates an exploded perspective view of the steering column interconnector depicted if FIG. 3;

FIG. 5 is a side view of a rolling elastomer contact embodiment which is useful in the steering column interconnector of the present invention; and FIG. 6 is a fragmentary side view of another rolling elastomer contact embodiment which is useful in the steering column interconnector of the present invention.

DETAILED DESCRIPTION OF THE PRESENTLY PREFERRED EMBODIMENTS

The present invention relates to a steering column interconnector that unites a sensor located in an automobile with an airbag located in a steering wheel of the automobile. In addition, the interconnector of the present invention is capable of having a plurality of circuits, and, therefore, the interconnector can also unite one or more stationary electrical apparatuses with an electrical switch, lamp, indicator, or like element located on the steering wheel.

A preferred embodiment of a steering column interconnector of this invention is shown in FIGS. 1–4. Referring to those figures, the steering column interconnector 10 is shown to include a rotor 12 associated with a stator 14 to create a radial space 16 surrounding an aperture 18. The aperture 18 passes through the rotor 12 and the stator 14. As in conventional clockspring interconnectors, the stator 14 is intended to provide a stationary mount on a steering column (steering column not shown) while the rotor 12 is associated with the stator 14 so that it rotates in relation to the stator 14. In a preferred embodiment, the rotor 12 and the stator 14 are made from an electrically insulating polymer material, such as a plastic.

The rotor 12 includes a first connector 20. The first connector 20 may include one or more terminal inserts 22 for uniting the interconnector with electrical or electrically actuated devices located in the steering wheel. The terminal inserts may be made of any electrically conductive material such as, for example, copper.

Since the automobile steering column interconnector 10 of the present invention can be used to provide a plurality of electrical connections between stationary sites in the automobile and the rotating steering wheel, the terminal inserts 22 of the first connector 20 may be electrically associated with, for example, a horn, cruise control, illumination devices on the steering wheel, radio controls, windshield wiper controls and/or lights. Accordingly, the number of terminal inserts 22 will be limited only by the number of circuits that can be associated with the automobile steering column interconnector of the present invention.

The automobile steering column interconnector 10 of the present invention includes a second connector 24 associated with the stator 14. The second connector 24 includes one or more terminal inserts 26 for uniting various electrical devices, ground circuits, and sources of electrical power to the automobile steering wheel interconnector 10. As with the terminal inserts 22 of the first connector 20, the terminal inserts 26 of the second connector 24 may be used for uniting apparatuses, such as windshield wipers, cruise

4 control, automobile horn and the like, with corresponding electrical and mechanical elements located in the automobile body. In the preferred embodiment, the terminal inserts 26 of the second connector 24 are connected to a harness (harness not shown) which provides conductive wires for running down the steering column and connecting to the various devices in the automobile body.

As shown in FIGS. 3 and 4, the rotor 12 includes an outer face 28 and an inner face 30. The inner face 30 of the rotor 12 includes one or more rotor annular recesses 32. The stator 14 also includes an outer face 34 and an inner face 36. The inner face 36 of the stator includes one or more stator annular recesses 38. Correspondingly, each stator annular recess 38 has a complementary rotor annular recess 32. That is, a rotor annular recess 32 has a corresponding stator annular recess 38 located at the same distance from the axis of the interconnect so that each corresponding annular recess 32,38 is perpendicularly connectable with a rolling elastomer contact 40.

One or more of the rotor annular recesses 32 must include a first electrically conductive track 42. Likewise, one or more of the stator annular recesses 38 must include a second electrically conductive track 44. At least one first electrically conductive track 42 must be complementary to a second electrically conductive track 44. Each first electrically conductive track 42 is electrically united to the first connector 20 while each second electrically conductive track 44 is electrically united to the second connector 24.

The first electrically conducting track 42 and the second electrically conductive track 44 are made of electrically conductive material. Thus, the tracks 42,44 can be made of, for example, electrically conductive plastic during a two-shot mold process, a copper plating process using in-mold circuit definition, or by insert molding stamped concentric copper or copper alloy rings.

It is also preferred that the first electrically conductive track 42 and the second electrically conductive track 44 be flat. However, it is not necessary that the electrically conductive tracks 42,44 be flat. Instead, they may contain a plurality of bumps, or they may take on any texture or shape that is useful for maintaining a constant and reliable electrical path between the first electrically conductive track 42 and a corresponding second electrically conductive track 44.

In a preferred embodiment, the interconnector 10 includes a plurality of first electrically conductive tracks 42 and second electrically conductive tracks 44. The tracks 42,44 are located in a radial pattern beginning around the center aperture 18 and radiating away from the aperture towards an outer wall 46 of the steering column interconnector. Correspondingly, the tracks 42,44 on both the rotor 12 and the stator 14 form concentric rings which are equally spaced apart and separated by ribs 48.

Conductively attached to the first electrically conductive track 42 and the second electrically conductive track 44 are the terminal inserts 22 and 26, respectively. The inserts 22,26 can be conductively attached to the tracks 42,44 by conventional means such as, for example, welding, soldering, etc.

The electrical paths through the interconnector 10 are completed in the present invention by one or more of the rolling elastomer contacts 40. It is preferred that each rolling elastomer contact 40 be shaped like a thin disk with a hole 50 in the center. Furthermore, each rolling elastomer contact 40 may be made of any element or combinations of elements which are able to simultaneously rotate and conduct an electrical current or signals since each rolling elastomer contact functions to transfer electrical current between the tracks 42 and 44.

Moreover, each rolling elastomer contact 40 is slightly compressible which allows it to be located in a slightly compressed state between a first electrically conductive track 42 and a corresponding second electrically conductive track 44. The compressibility of each rolling elastomer contact 40 acts to relieve compression strain on the conductive tracks 42,44.

A preferred rolling elastomer contact 40 is shown in FIG. 5. The rolling elastomer contact 40 is made of an elastomer material such as, for example, rubber or silicone. Impregnated within the elastomer material are conductive metal flakes. The flakes can consist of silver, copper, a copper alloy, etc., or any combination thereof. A rolling elastomer contact made of silicone, such as General Electric LIM6060, impregnated with silver flakes has been successfully used in the interconnector of the present invention. The rolling elastomer contact consisted of, be volume, 80% silicone and 20% silver flakes.

The rolling elastomer contact 40 may take on other shapes and forms. For example, as shown in FIG. 6, the contact 40' may have a continuous metallic ring 52 embedded within the impregnated elastomer material. The metallic ring 52 may consist of, for example, copper with dimensional characteristic similar to that of 22-gage wire. Thus, with the metallic ring 52 being surrounded by the impregnated elastomer material 54, the rolling elastomer contact 40' of FIG. 6 will be able transmit higher current than the contact 40 of FIG. 5. Furthermore, surrounding the metallic ring 52 with the impregnated elastomer material 54 prevents the ring from failing since the elastomer material 54 will absorb most of the stress due to compression of the rolling contact.

As mentioned above, the contacts 40 within the interconnector 10 are made of at least in part of electrically conductive material. It is preferred that the contacts 40 are made from an elastomer material which is impregnated with conductive metal flakes. It is also preferred that the contacts 40 have a spring-like nature which makes the contacts 40 slightly compressible. In a preferred embodiment the contact will compress by 80 to 90% when positioned within the steering column interconnector 10. This compressibility feature becomes important when the rotor 12 is united with the stator 14. Slightly compressing the contacts 40 between the first electrically conductive track 42 and the second electrically conductive track 44 ensures that the contacts 40 are always being urged toward the electrically conductive tracks 42,44 thereby facilitating a continuous and effective electrical connection between the rotor 12 and the stator 14.

One or more rolling contacts 40,50 (See FIG. 4) may be associated with each of the electrically conductive tracks 42 and 44. It is preferred that at least two of the contacts 40,50 are associated with each of the electrically conductive tracks 42 and 44. That way, if one contact 40 loses its electrical effectiveness, then a second contact 50 will be available to maintain the electrical path across the steering column interconnector.

Referring to the operation characteristics of the interconnector 10 as indicated above, the rotor 12 of the interconnector 10 rotates in a circular fashion, with motion being provided by a shaft (shaft not shown) which extends through the steering column that goes through the interconnector center aperture 18. Accordingly, each elastomer rolling contact 40 rolls between the stator 14 and the rotor 12 while continuously maintaining an electrical connection between both of the electrically conductive tracks 42,44. Therefore, an electrical path is provided at all times from the terminal inserts 22 of the 20 first connector to the terminal inserts 26 of the second connector 24.

It should be understood that various changes and modifications to the presently preferred embodiments described here will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A steering column interconnector comprising:

a stator;

a rotor rotatably associated with the stator to create a radial space;

an aperture passing through the rotor and the stator;

a rotor annular recess associated with an inner face of the rotor containing a first electrically conductive track associated with a first connector;

a stator annular recess located on the inner face of the stator complementary to the rotor annular recess, the stator annular recess including a second electrically conductive track associated with a second connector; and an elastomer rolling contact having metallic flakes impregnated therein and electrically uniting the first electrically conductive track and the second electrically conductive track, the elastomer rolling contact capable of rotation between the rotor and the stator due to relative rotation between said first and second tracks.

2. The steering column interconnector of claim 1 wherein two or more of said elastomer rolling contacts electrically unite the first electrically conductive track with the second electrically conductive track.

3. The steering column interconnector of claim 1 wherein the first and the second electrically conductive tracks are not coplanar.

4. The steering column interconnector of claim 1 wherein the elastomer rolling contact is circular.

5. The steering column interconnector of claim 1 wherein one or more elastomer rolling contacts electrically unite each of the plurality of first electrically conductive tracks and second electrically conductive tracks.

6. The steering column interconnector of claim 1 wherein the first connector and the second connector each include a plurality of inserts.

7. The steering column interconnector of claim 1 wherein the elastomer rolling contact further includes a metallic ring embedded therein.

8. A steering column interconnector comprising:

a stator;

a rotor rotatably associated with the stator to create a radial space;

an aperture passing through the rotor and the stator;

a first connector associated with the rotor;

a second connector associated with the stator;

a plurality of rotor annular recesses associated with an inner face of the rotor, each rotor annular recess including a first electrically conductive track;

a plurality of stator annular recesses associated with an inner face of the stator, each stator annular recess including a second electrically conductive track; and an elastomer rolling contact including conductive particles and electrically uniting complementary ones of said first electrically conductive tracks with respective ones of said second electrically conductive tracks wherein the elastomer rolling contact is capable of rotation between the stator and the rotor due to relative rotation between said first and second tracks.

* * * * *